(12) United States Patent
Oya (10) Patent No.: US 8,200,356 B2
(45) Date of Patent: Jun. 12, 2012

(54) SEMICONDUCTOR MANUFACTURING APPARATUS DATA ACQUISITION APPARATUS AND SEMICONDUCTOR MANUFACTURING SYSTEM

(75) Inventor: Yuichi Oya, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 537 days.

(21) Appl. No.: 12/100,184

(22) Filed: Apr. 9, 2008

(65) Prior Publication Data

US 2008/0256226 A1 Oct. 16, 2008

(30) Foreign Application Priority Data

Apr. 12, 2007 (JP) ................................. 2007-104830

(51) Int. Cl.
*G06F 19/00* (2011.01)
(52) U.S. Cl. .............................. 700/121; 700/82; 700/96
(58) Field of Classification Search ................... 700/79, 700/82, 96, 121
See application file for complete search history.

(56) References Cited

U.S. PATENT DOCUMENTS

| | | | | |
|---|---|---|---|---|
| 5,185,693 | A * | 2/1993 | Loftis et al. .................... | 700/82 |
| 6,216,051 | B1 * | 4/2001 | Hager et al. .................... | 700/82 |
| 7,324,855 | B2 | 1/2008 | Ushiku et al. | |

FOREIGN PATENT DOCUMENTS

JP 2006-93641 4/2006

* cited by examiner

*Primary Examiner* — Kakali Chaki
*Assistant Examiner* — Nathan Laughlin
(74) *Attorney, Agent, or Firm* — Finnegan, Henderson, Farabow, Garrett & Dunner, L.L.P.

(57) ABSTRACT

A semiconductor manufacturing apparatus data acquisition apparatus is provided. The apparatus has a production management system interface unit which may communicate with the production management system, an apparatus interface unit which communicates with the semiconductor manufacturing apparatus, and a production management system substitution unit which may communicate with the semiconductor manufacturing apparatus via the apparatus interface unit. When the production management system can communicate with the production management system interface unit, the production management system and the semiconductor manufacturing apparatus communicate with each other via the production management system interface unit and the apparatus interface unit to receive process data output from the semiconductor manufacturing apparatus. When the production management system cannot communicate with the production management system interface unit, the production management system substitution unit and the semiconductor manufacturing apparatus communicate with each other via the apparatus interface unit to receive process data output from the semiconductor manufacturing apparatus.

15 Claims, 8 Drawing Sheets

FIG. 8

SEMICONDUCTOR MANUFACTURING APPARATUS DATA ACQUISITION APPARATUS AND SEMICONDUCTOR MANUFACTURING SYSTEM

CROSS REFERENCE TO RELATED APPLICATION

This application is based upon and claims benefit of priority under 35 USC §119 from the Japanese Patent Application No. 2007-104830, filed on Apr. 12, 2007, the entire contents of which are incorporated herein by reference.

BACKGROUND OF THE INVENTION

The present invention relates to a semiconductor manufacturing apparatus data acquisition apparatus for acquiring process data from a semiconductor manufacturing apparatus and a semiconductor manufacturing system.

A production management system manages a semiconductor device manufacturing plan, and the semiconductor manufacturing apparatus manufactures semiconductor devices in accordance with the instruction of the plan. The production management system sends a request representing necessary data of all the process data to the semiconductor manufacturing apparatus. In response to this request, the semiconductor manufacturing apparatus outputs the requested process data, and a data acquisition apparatus acquires the necessary data.

The semiconductor manufacturing apparatus and the production management system are connected via the data acquisition apparatus and can exchange data with each other. In a situation in which the semiconductor manufacturing apparatus and the production management system are on-line connected to allow data communication between them, the data acquisition apparatus can acquire the process data output from the semiconductor manufacturing apparatus.

However, at the time of installing and starting the semiconductor manufacturing apparatus, for example, the semiconductor manufacturing apparatus often operates standalone and is not on-line connected to the production management system. In this case, no data communication is done between the semiconductor manufacturing apparatus and the production management system. The production management system cannot send an instruction requesting specific process data to the semiconductor manufacturing apparatus. Therefore, the data acquisition apparatus cannot acquire any process data.

When an apparatus recipe is not confirmed in advance, no data communication is done with the production management system. The semiconductor manufacturing apparatus often operates off-line.

Under these circumstances, no data communication is done between the semiconductor manufacturing apparatus and the production management system, and no data acquisition is possible.

A reference disclosing a technique pertaining to conventional semiconductor manufacturing apparatus data acquisition will be given below.

Japanese Patent Laid-Open No. 2006-93641

SUMMARY OF INVENTION

According to one aspect of the present invention, there is provided a semiconductor manufacturing apparatus data acquisition apparatus which communicates with a semiconductor manufacturing apparatus or with a semiconductor management system and the semiconductor manufacturing apparatus, comprising: a production management system interface unit which communicates with the production management system when said production management system interface unit is electrically connected to the production management system; an apparatus interface unit which communicates with the semiconductor manufacturing apparatus; and a production management system substitution unit which communicates with the semiconductor manufacturing apparatus via said apparatus interface unit when the production management system can not communicate with said production management system interface unit, wherein when the production management system can communicate with said production management system interface unit, the production management system and the semiconductor manufacturing apparatus communicate with each other via said production management system interface unit and said apparatus interface unit to receive process data output from the semiconductor manufacturing apparatus, and when the production management system cannot communicate with said production management system interface unit, said production management system substitution unit and the semiconductor manufacturing apparatus communicate with each other via said apparatus interface unit to receive the process data output from the semiconductor manufacturing apparatus.

According to one aspect of the present invention, there is provided a semiconductor manufacturing system comprising: a production management system which outputs an instruction about manufacture of a semiconductor device and a request for process data; a semiconductor manufacturing apparatus which manufactures the semiconductor device upon reception of the instruction and outputs process data in accordance with the request; and a semiconductor manufacturing apparatus data acquisition apparatus which communicates with said semiconductor manufacturing apparatus or with said semiconductor management system and said semiconductor manufacturing apparatus, said semiconductor manufacturing apparatus data acquisition apparatus including a production management system interface unit which communicates with the production management system when said production management system interface unit is electrically connected to the production management system, an apparatus interface unit which communicates with the semiconductor manufacturing apparatus, and a production management system substitution unit which communicates with the semiconductor manufacturing apparatus via said apparatus interface unit when the production management system cannot communicate with said production management system interface unit, when the production management system can communicate with said production management system interface unit, the production management system and the semiconductor manufacturing apparatus communicating with each other via said production management system interface unit and said apparatus interface unit to receive process data output from the semiconductor manufacturing apparatus, and when the production management system cannot communicate with said production management system interface unit, said production management system substitution unit and the semiconductor manufacturing apparatus communicating with each other via said apparatus interface unit to receive the process data output from the semiconductor manufacturing apparatus.

According to one aspect of the present invention, there is provided a semiconductor manufacturing apparatus data acquisition apparatus which communicates with a semiconductor manufacturing apparatus or with a semiconductor management system and the semiconductor manufacturing apparatus, comprising: an interface unit which communicates with the production management system and the semiconductor manufacturing apparatus when said production management system interface unit is electrically connected to the production management system; and a production management system substitution unit which communicates with the semiconductor manufacturing apparatus via said interface unit when the production management system cannot communicate with said interface unit, wherein when the production management system can communicate with said interface unit, the production management system and the semiconductor manufacturing apparatus communicate with each other via said interface unit to receive process data output from the semiconductor manufacturing apparatus, and when the production management system cannot communicate with said interface unit, said production management system substitution unit and the semiconductor manufacturing apparatus communicate with each other via said interface unit to receive the process data output from the semiconductor manufacturing apparatus.

DETAILED DESCRIPTION OF THE INVENTION

Preferred embodiments of the present invention will be described in detail with reference to the accompanying drawings.

(1) First Embodiment

Figure 1:
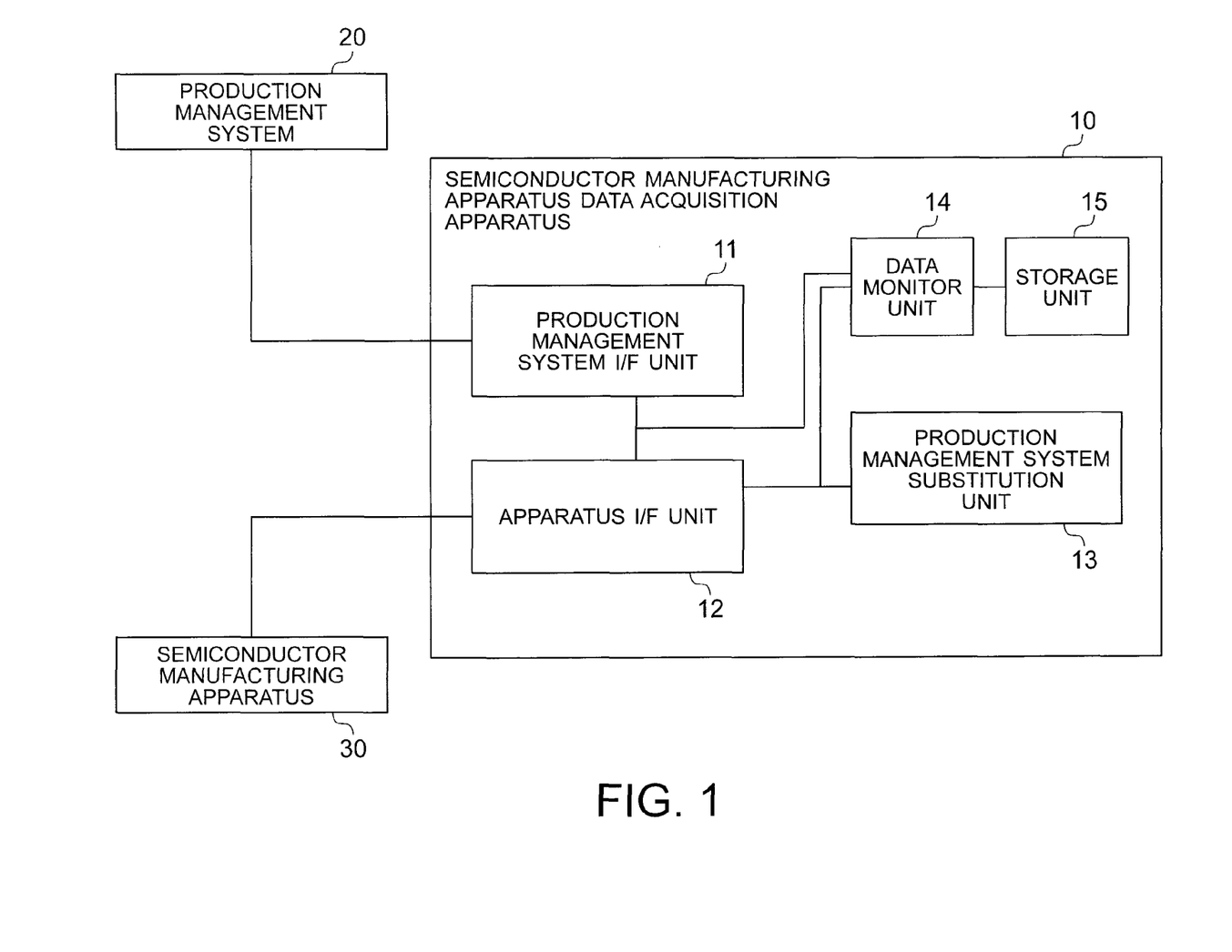
FIG. 1 is a block diagram showing the arrangement of a semiconductor manufacturing apparatus data acquisition apparatus and the connection relationship between the semiconductor manufacturing apparatus data acquisition apparatus, a production management system, and a semiconductor manufacturing system having a semiconductor manufacturing apparatus according to the first embodiment of the present invention.

FIG. 1 shows the arrangement of a semiconductor manufacturing apparatus data acquisition apparatus, and the arrangement of a semiconductor manufacturing system having the semiconductor manufacturing apparatus data acquisition apparatus according to the first embodiment of the present invention.

The semiconductor manufacturing system according to the first embodiment comprises a production management system 20 and a semiconductor manufacturing apparatus 30 in addition to a semiconductor manufacturing apparatus data acquisition apparatus 10. The production management system 20 and the semiconductor manufacturing apparatus 30 are connected via the semiconductor manufacturing apparatus data acquisition apparatus 10.

The semiconductor manufacturing apparatus data acquisition apparatus 10 comprises an interface unit (to be referred to as an I/F hereinafter) 11, an apparatus I/F unit 12, a production management system substitution unit 13, a storage unit 15, and a data monitor unit 14. The I/F unit 11 interfaces data communication with the production management system 20. The I/F unit 12 interfaces data communication with the semiconductor manufacturing apparatus 30. The production management system substitution unit 13 functions as a substitution unit of the production management system 20 when data communication is not allowed with the production management system 20. The storage unit 15 stores process data. The data monitor unit 14 determines the validity of the data transferred between the production management system I/F unit 11 and the apparatus I/F unit 12 and the data transferred between the apparatus I/F unit 12 and the production management system substitution unit 13, and when the transfer data is valid, transfers process data output from the semiconductor manufacturing apparatus 30 and stores it in the storage unit 15.

The production management system 20 is connected to the production management system I/F unit 11, and the semiconductor manufacturing apparatus 30 is connected to the apparatus I/F unit 12.

Figure 2:
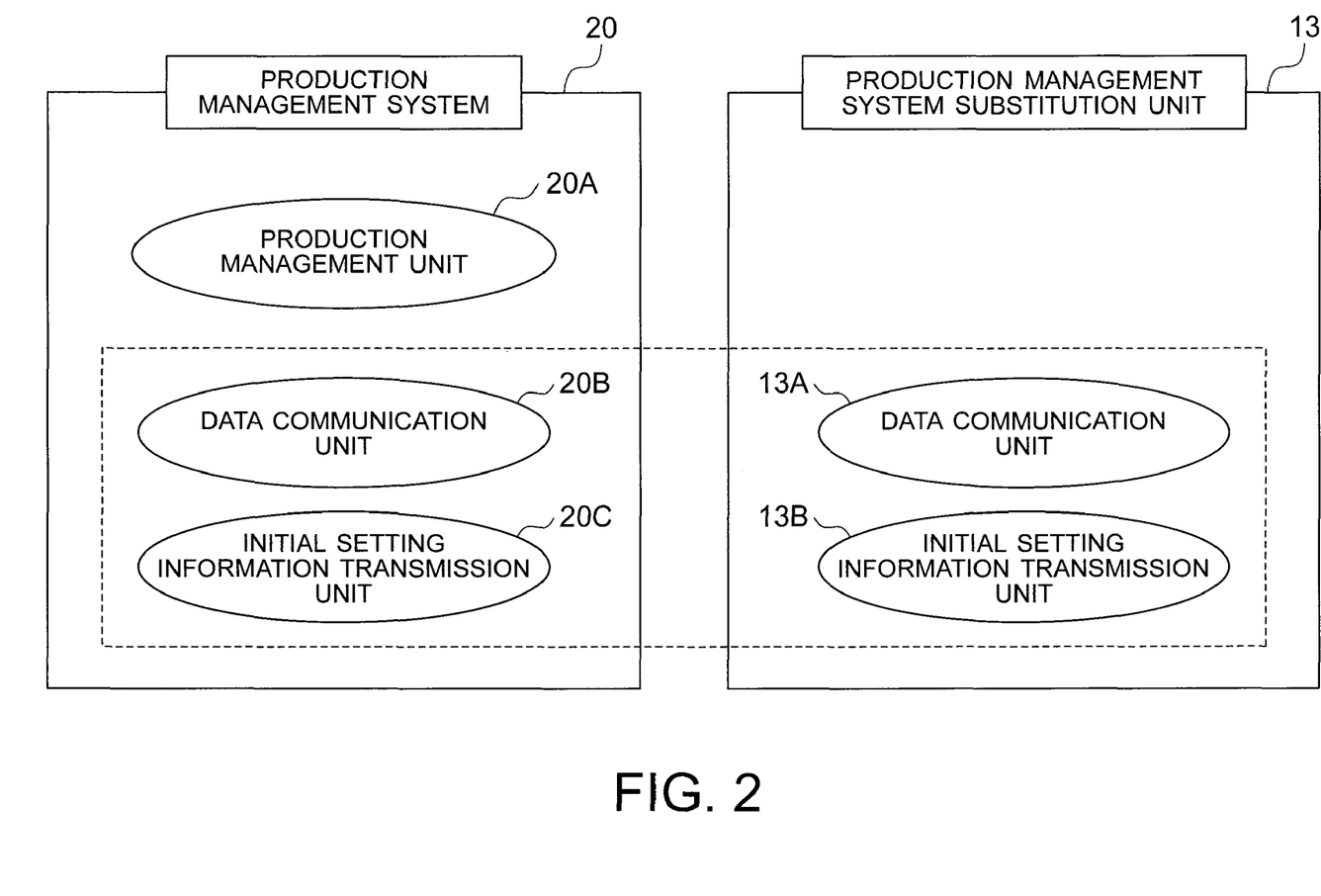
FIG. 2 is a block diagram for explaining the comparison between the arrangement of a production management system substitution part and the arrangement of a production management system in the semiconductor manufacturing apparatus data acquisition apparatus of the first embodiment.

FIG. 2 shows the comparison between the arrangement of the production management system substitution unit 13 and the arrangement of the production management system 20.

The production management system 20 comprises a data communication unit 20B and an initial setting information transmission unit 20C in addition to a production management unit 20A which manages production in the manufacture of semiconductor devices by the semiconductor manufacturing apparatus 30. The data communication unit 20B performs data communication with the semiconductor manufacturing apparatus 30 via the production management system I/F unit 11 in the semiconductor manufacturing apparatus data acquisition apparatus 10. The initial setting information transmission unit 20C transmits information required to request the semiconductor manufacturing apparatus data acquisition apparatus 10 to send process data, such as initial setting information required for pre-registration upon acquiring process data from the semiconductor manufacturing apparatus 30.

The production management system substitution unit 13 does not comprise a production management unit, but comprises a data communication unit 13A having a function equivalent to that of the data communication unit 20B and an initial setting information transmission unit 13B having a function equivalent to that of the initial setting information transmission unit 20C.

Figure 3:
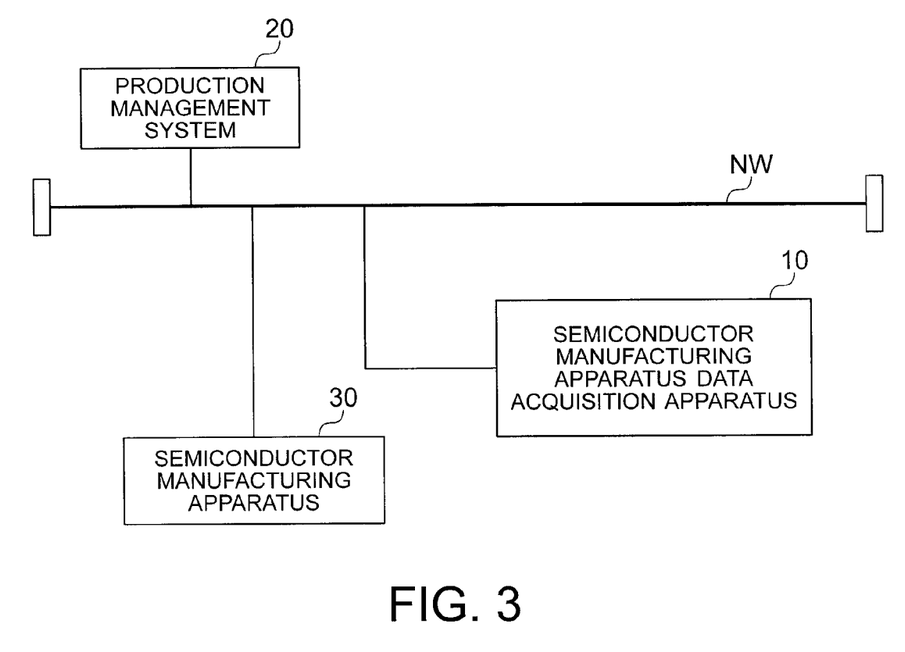
FIG. 3 is a block diagram for explaining network connections between the semiconductor manufacturing apparatus data acquisition apparatus, production management system, and semiconductor manufacturing apparatus of the first embodiment.

FIG. 3 shows an example of the physical connection environment of the semiconductor manufacturing apparatus data acquisition apparatus 10, the production management system 20, and the semiconductor manufacturing apparatus 30. The semiconductor manufacturing apparatus data acquisition apparatus 10, the production management system 20, and the semiconductor manufacturing apparatus 30 are connected to each other via a network NW.

The production management system 20 is on-line connected to the production management system I/F unit 11 in the semiconductor manufacturing apparatus data acquisition apparatus 10. The semiconductor manufacturing apparatus 30 is on-line connected to the apparatus I/F unit 12 in the data acquisition apparatus 10. This makes it possible to allow the production management system substitution unit 13 to on-line connect the semiconductor manufacturing apparatus 30 via the apparatus I/F unit 12. For this purpose, the semiconductor manufacturing apparatus 30 and the production management system substitution unit 13 must be connected using identical protocols.

The operation of the first embodiment having the above arrangement will be described below.

The production management system 20 has a plan to allow the semiconductor manufacturing apparatus 30 to manufacture semiconductor devices and outputs an instruction about the manufacture to the semiconductor manufacturing apparatus 30. The semiconductor manufacturing apparatus 30 manufactures semiconductor devices based on this instruction.

The production management system 20 outputs a request for necessary process data of the process data associated with the manufacturing recipe such as a temperature, pressure, film thickness in film formation, and types and flow rates of liquids and gases in the manufacture of semiconductor devices. The semiconductor manufacturing apparatus 30 outputs process data in accordance with this request, and the data acquisition apparatus 10 acquires the output process data.

Figure 4:
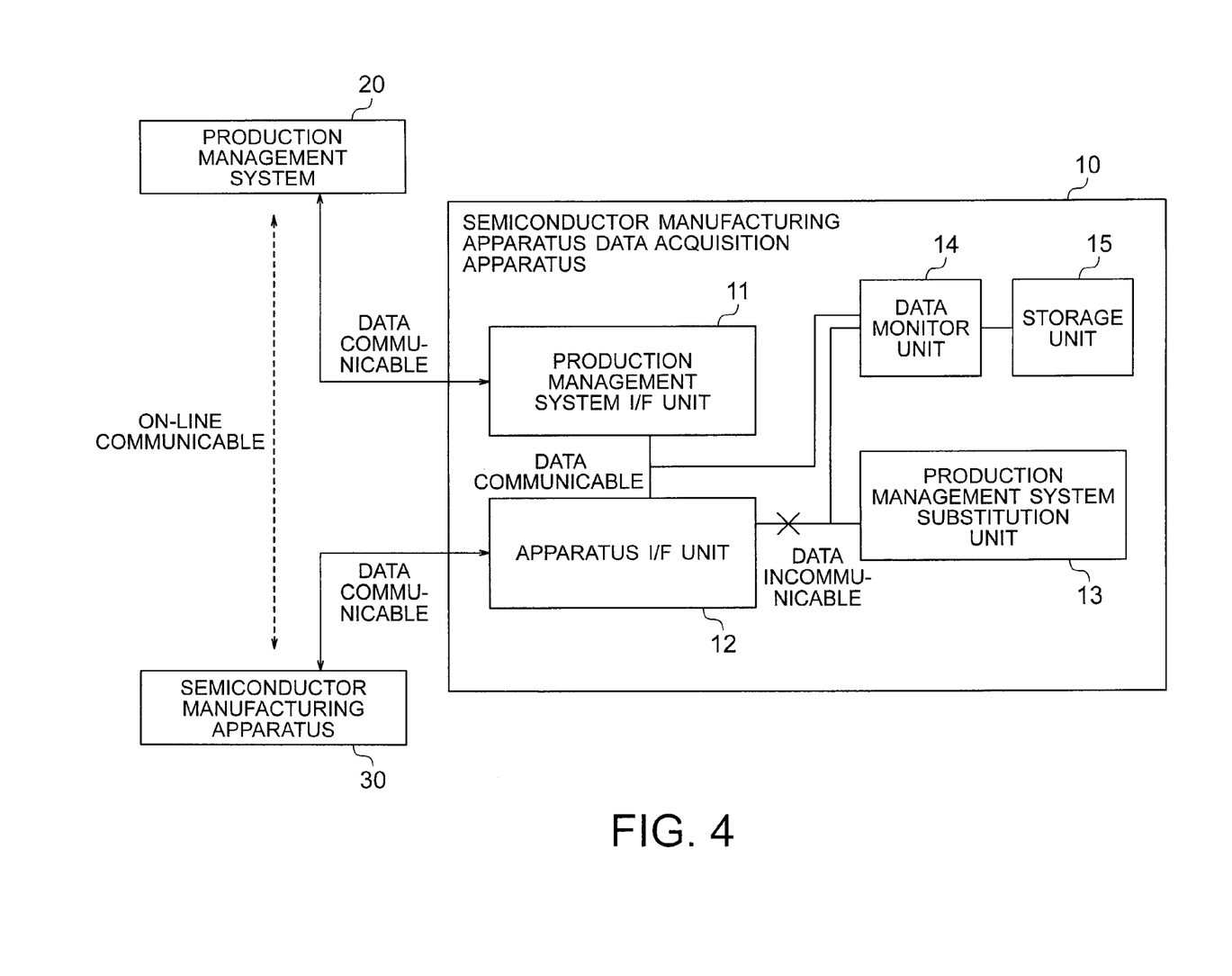
FIG. 4 is a block diagram for explaining the operating state of the semiconductor manufacturing apparatus data acquisition apparatus when data communication is allowed between the semiconductor manufacturing apparatus data acquisition apparatus and the production management system according to the first embodiment.

FIG. 4 shows a case in which the production management system 20 and the production management system I/F unit 11 in the semiconductor manufacturing apparatus data acquisition apparatus 10 are on-line connected to each other and set in a data communicable state. In this case, the production management system 20 and the semiconductor manufacturing apparatus 30 are in an on-line communicable state via the production management system I/F unit 11 and the apparatus I/F unit 12.

In this case, data communication is not done between the apparatus I/F unit 12 and the production management system substitution unit 13, and the production management system substitution unit 13 is set in an inoperative state.

The production management system 20 outputs a request for necessary process data, and the semiconductor manufacturing apparatus 30 receives this request via the production management system I/F unit 11 and the apparatus I/F unit 12. The data monitor unit 14 determines whether data supplied from the production management system I/F unit 11 is valid. If this data is valid, the data monitor unit 14 outputs the data to the apparatus I/F unit 12.

The semiconductor manufacturing apparatus 30 outputs the requested produces data to the apparatus I/F unit 12. The data monitor unit 14 determines whether this process data is valid. If the process data is valid, the data monitor unit 14 stores it in the storage unit 15.

Figure 5:
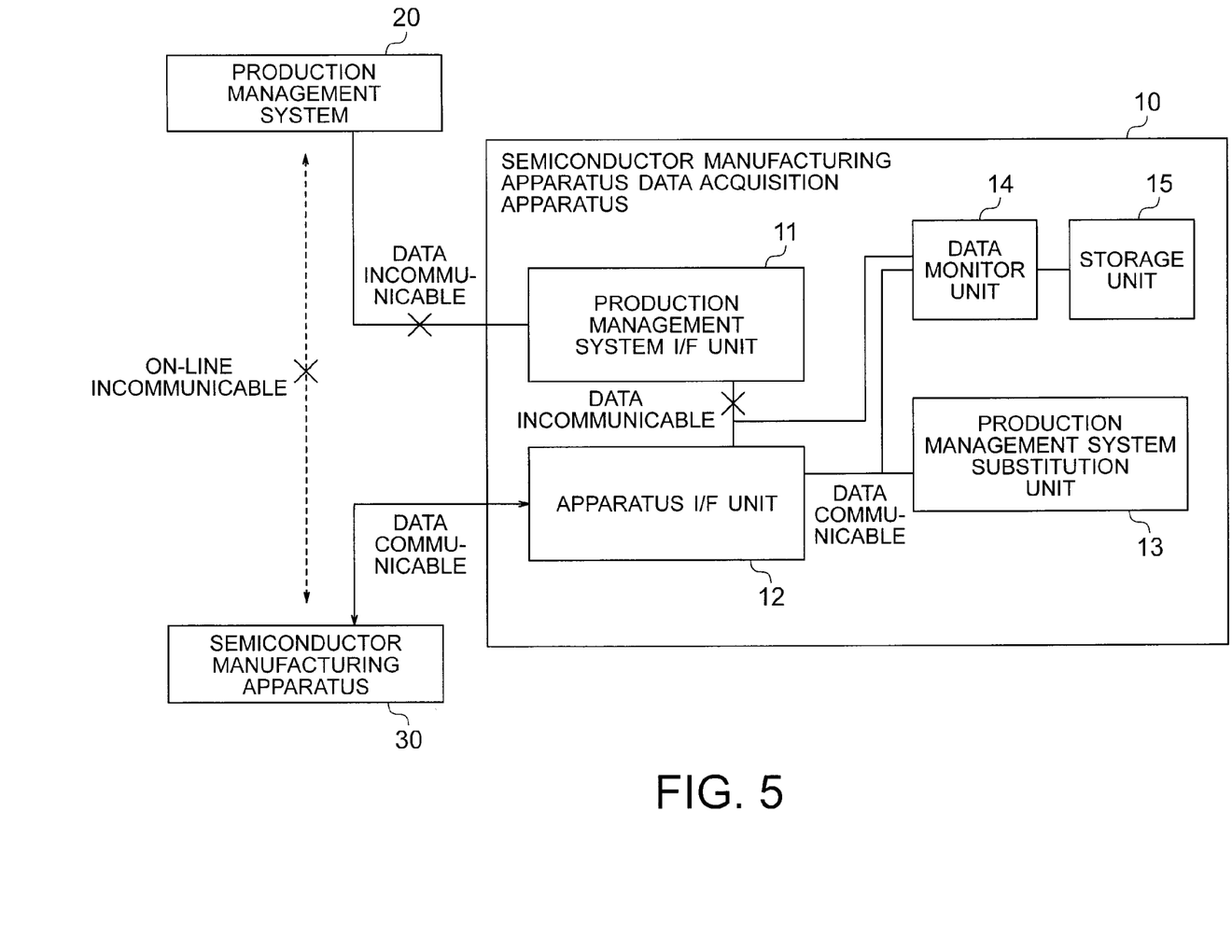
FIG. 5 is a block diagram for explaining the operating state of the semiconductor manufacturing apparatus data acquisition apparatus when the data communication is not allowed between the semiconductor manufacturing apparatus data acquisition apparatus and the production management system according to the first embodiment.

FIG. 5 shows a state in which the production management system 20 is not on-line connected to the production management system I/F unit 11 in the semiconductor manufacturing apparatus data acquisition apparatus 10, and no data communication is allowed. In this case, the production management system 20 is not on-line communicable with the semiconductor manufacturing apparatus 30.

In this case, the production management system substitution unit 13 is set in an operative state instead of the data communication between the production management system 20 and the production management system I/F unit 11. Data communication is done between the production management system substitution unit 13 and the apparatus I/F unit 12.

In place of the production management system 20, the production management system substitution unit 13 outputs a request for necessary process data. This request is sent to the semiconductor manufacturing apparatus 30 via the apparatus I/F unit 12.

The semiconductor manufacturing apparatus 30 outputs the requested process data to the apparatus I/F unit 12. The data monitor unit 14 determines whether this data is valid. If the process data is valid, the data monitor unit 14 stores it in the storage unit 15.

As described above, according to the first embodiment, even if data communication is not allowed between the production management system 20 and the semiconductor manufacturing apparatus 30, the production management system substitution unit 13 can communicate with the semiconductor manufacturing apparatus 30 in place of the production management system 20, thereby acquiring process data from the semiconductor manufacturing apparatus 10. At the time of installing and starting the semiconductor manufacturing apparatus 30, even if the production management system 20 is not connected to the network and data communication is not allowed, the process data can be acquired from the semiconductor manufacturing apparatus 30.

Process data can be acquired from the semiconductor manufacturing apparatus 30 even for a lot for which a manufacturing recipe is not confirmed in the production management system 20 in advance and the semiconductor manufacturing apparatus 30 must manufacture semiconductor devices in an off-line state with the production management system 20.

(2) Second Embodiment

Figure 6:
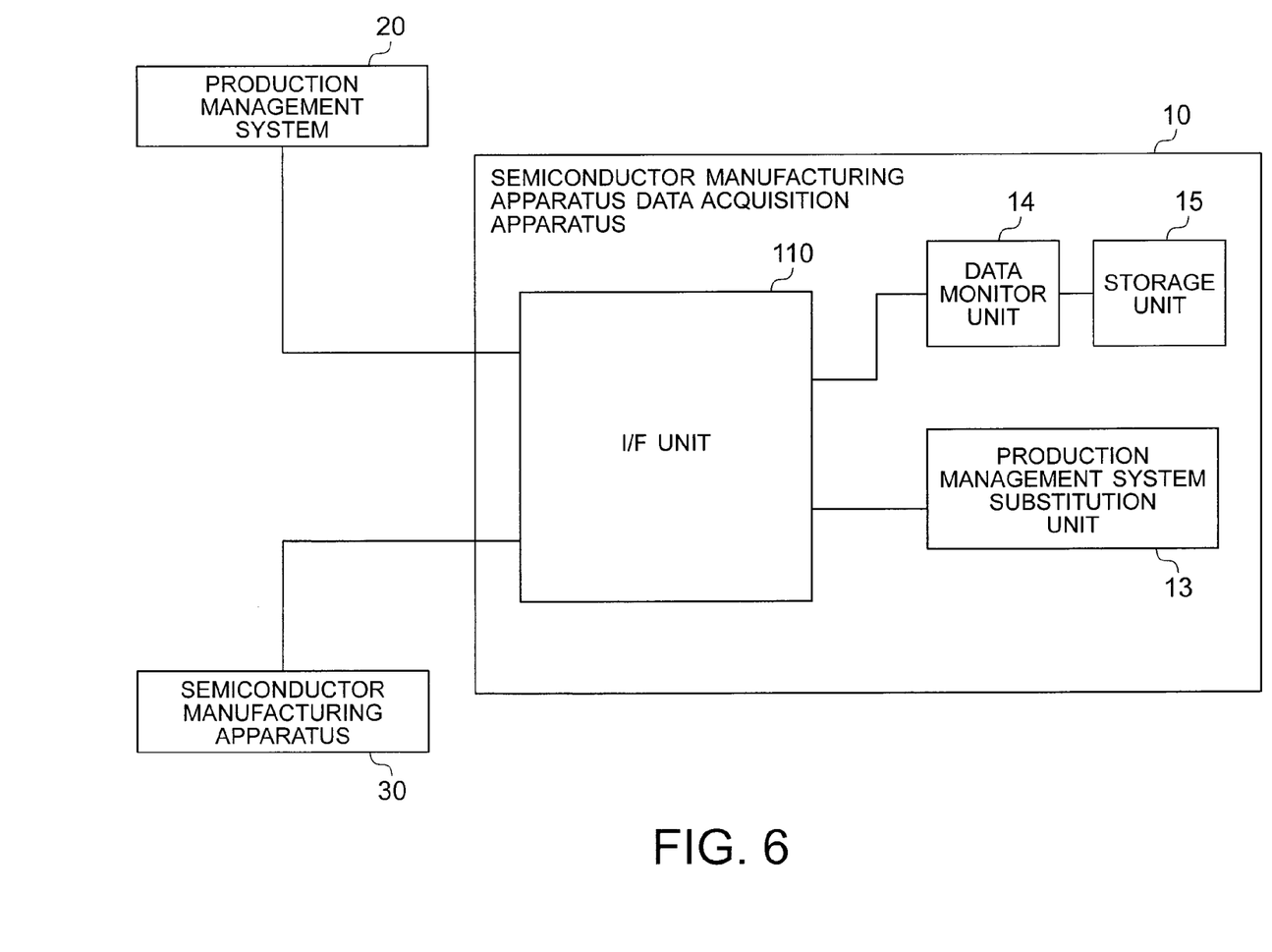
FIG. 6 is a block diagram showing the arrangement of a semiconductor manufacturing apparatus data acquisition apparatus and the connection relationship between the semiconductor manufacturing apparatus data acquisition apparatus, a production management system, and a semiconductor manufacturing system having a semiconductor manufacturing apparatus according to the second embodiment of the present invention.

The second embodiment of the present invention will be described with reference to FIG. 6 showing its arrangement.

According to the second embodiment, the production management system I/F unit 11 and the apparatus I/F unit 12 in the first embodiment replace an I/F unit 110. The same reference numerals as in the first embodiment denote the same parts in the second embodiment, and a description thereof will not be repeated.

A production management system 20 is on-line connected to the I/F unit 110 in a semiconductor manufacturing apparatus data acquisition apparatus 100, and data communication is allowed between them. In this case, the production management system 20 is on-line communicable with the semiconductor manufacturing apparatus 30 via the I/F unit 110.

In this case, data communication is not done between the I/F unit 110 and a production management system substitution unit 13, and the production management system substitution unit 13 is set in an inoperative state.

The production management system 20 outputs a request for necessary process data. This request is sent to the semiconductor manufacturing apparatus 30 via the I/F unit 110.

The semiconductor manufacturing apparatus 30 outputs the requested process data to the I/F unit 110. A data monitor unit 14 monitors the validity of this data. If the data monitor unit 14 determines that the process data is valid, it stores the data in a storage unit 15.

When the production management system 20 is not on-line connected to the I/F unit 110 in the semiconductor manufacturing apparatus data acquisition apparatus 10, and no data communication is allowed between them, the production management system 20 is not on-line communicable with the semiconductor manufacturing apparatus 30.

In this case, the production management system substitution unit 13 is set in an operative state instead of data communication between the production management system 20 and the I/F unit 110. Data communication is done between the production management system substitution unit 13 and the I/F unit 110.

In place of the production management system 20, the production management system substitution unit 13 outputs a request for necessary process data, and this request is sent to the semiconductor manufacturing apparatus 30 via the I/F unit 110.

The semiconductor manufacturing apparatus 30 outputs the requested process data to the I/F unit 110. The data monitor unit 14 determines whether this process data is valid. If the process data is valid, the data monitor unit 14 stores it in the storage unit 15.

As in the first embodiment, according to the second embodiment, when data communication is not allowed between the production management system 20 and the semiconductor manufacturing apparatus 30, the production management system substitution unit 13 communicates data with the semiconductor manufacturing apparatus 30 in place of the production management system 20, thereby acquiring the process data from the semiconductor manufacturing apparatus 10.

According to each embodiment described above, even in a situation in which the semiconductor manufacturing apparatus cannot communicate data with the production management system, the process data output from the semiconductor manufacturing apparatus can be acquired.

Figure 7:
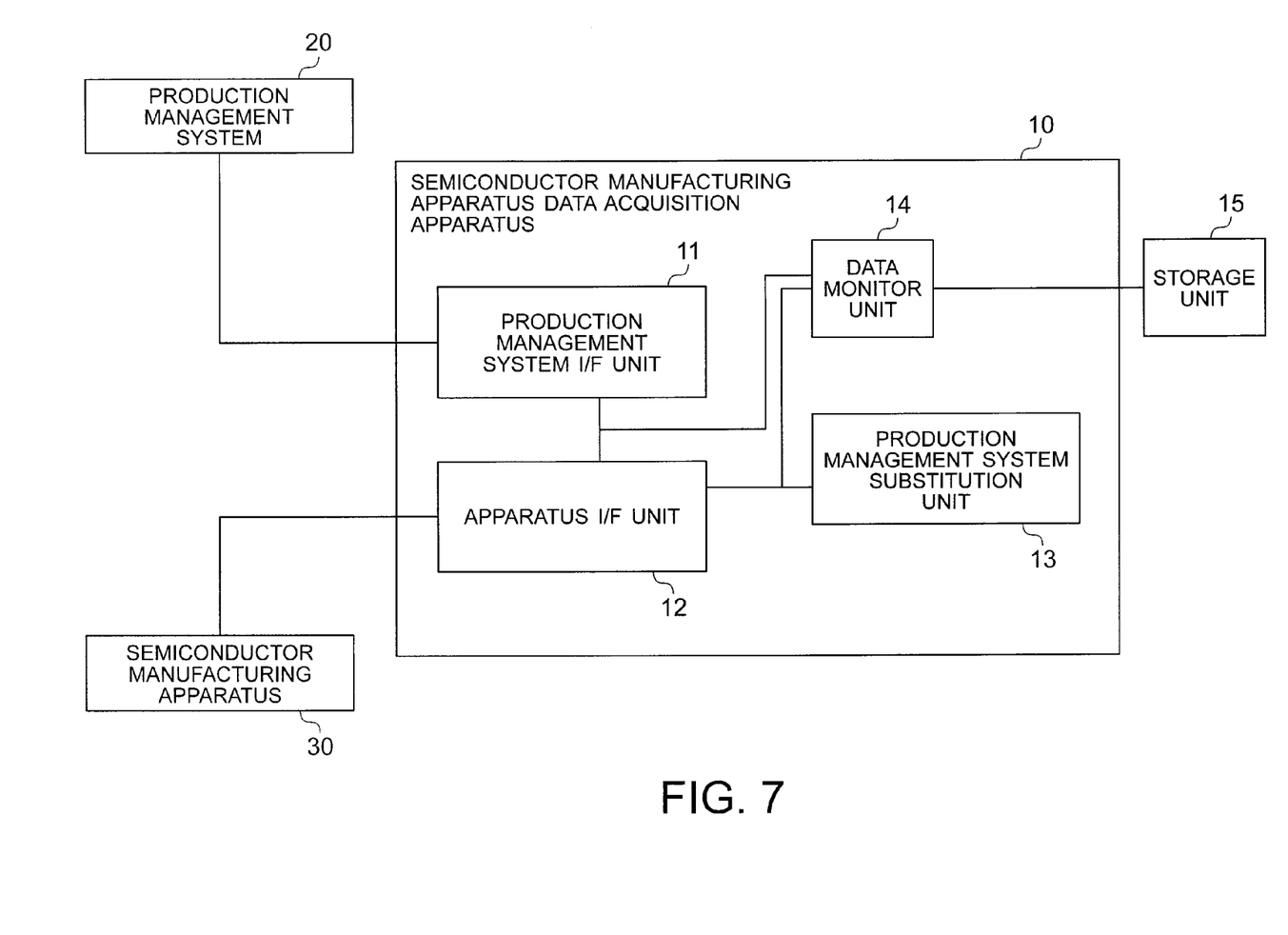
FIG. 7 is a block diagram showing the arrangement of a semiconductor manufacturing apparatus data acquisition apparatus and the connection relationship between the semiconductor manufacturing apparatus data acquisition apparatus, a production management system, and a semiconductor manufacturing system having a semiconductor manufacturing apparatus according to a modified example of the first embodiment of the present invention.
Figure 8:
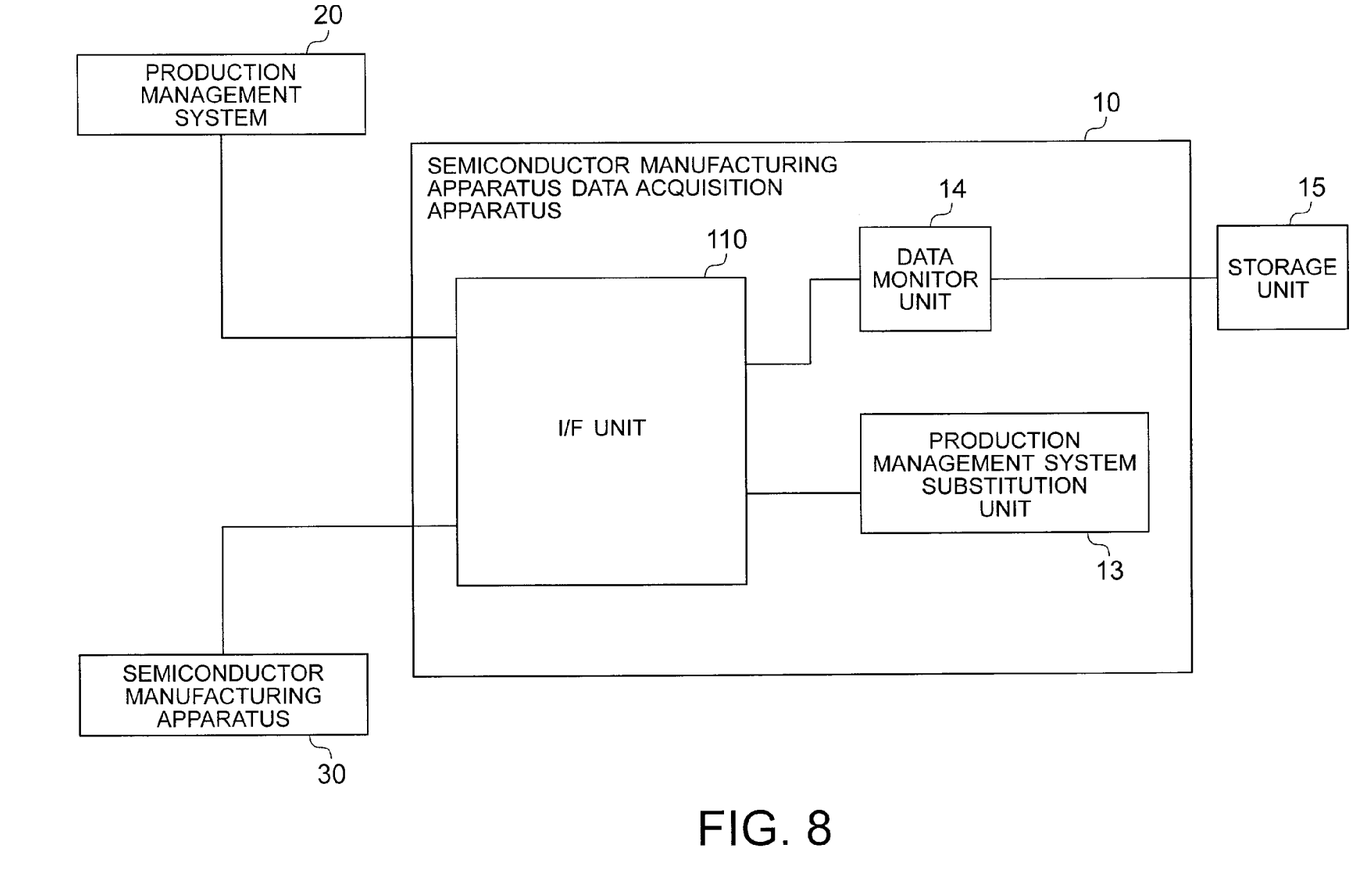
FIG. 8 is a block diagram showing the arrangement of a semiconductor manufacturing apparatus data acquisition apparatus and the connection relationship between the semiconductor manufacturing apparatus data acquisition apparatus, a production management system, and a semiconductor manufacturing system having a semiconductor manufacturing apparatus according to a modified example of the second embodiment of the present invention.

The above embodiments are merely examples and do not limit the present invention. Various changes and modifications can be made within the technical scope of the present invention. For example, in each embodiment described above, the semiconductor manufacturing apparatus data acquisition apparatus 10 includes the storage unit 15 which stores the process data sent from the semiconductor manufacturing apparatus 30. The storage unit which stores the process data need not be included in the semiconductor manufacturing apparatus data acquisition apparatus. As shown in FIGS. 7 and 8, an external storage unit may be used.

What is claimed is:

1. A semiconductor manufacturing apparatus data acquisition apparatus which communicates with a semiconductor manufacturing apparatus and configured to communicate with both the semiconductor manufacturing apparatus and a production management system, the production management system including a production management unit, the semiconductor manufacturing apparatus data acquisition apparatus comprising:

a production management system interface unit which communicates with the production management system when said production management system interface unit is electrically connected to the production management system;

an apparatus interface unit which communicates with the semiconductor manufacturing apparatus; and a production management system substitution unit having a data communication unit which communicates with the semiconductor manufacturing apparatus via said apparatus interface unit when the production management system can not communicate with said production management system interface unit, and an initial setting information transmission unit which transmits initial setting information required for pre-registration upon acquiring process data from the semiconductor manufacturing apparatus, the production management system substitution unit not having a production management unit, wherein when the production management system can communicate with said production management system interface unit, the production management system and the semiconductor manufacturing apparatus communicate with each other via said production management system interface unit and said apparatus interface unit to receive process data output from the semiconductor manufacturing apparatus, and when the production management system cannot communicate with said production management system interface unit, said production management system substitution unit and the semiconductor manufacturing apparatus communicate with each other via said apparatus interface unit to receive the process data output from the semiconductor manufacturing apparatus.

2. The acquisition apparatus according to claim 1, further comprising:

a storage unit which stores the process data upon receiving the process data; and a data monitor unit which monitors validity of the process data transferred from the semiconductor manufacturing apparatus to said apparatus interface unit and transfers the process data to said storage unit when the process data is determined to be valid.

3. The acquisition apparatus according to claim 2, wherein said production management system substitution unit comprises:

a data communication unit which performs data communication with the semiconductor manufacturing apparatus via said apparatus interface unit; and an initial setting information transmission unit which transmits initial setting information necessary for requesting said storage unit to send process data.

4. The acquisition apparatus according to claim 1, wherein said apparatus interface unit is connected to the semiconductor manufacturing apparatus via a network, and said production management system interface unit is connected to the production management system via the network, and said production management system substitution unit is on-line connected to the semiconductor manufacturing apparatus via said apparatus interface unit and the network, and said production management system substitution unit is connected to the semiconductor manufacturing apparatus using identical communication protocols.

5. An acquisition apparatus according to claim 2, wherein said apparatus interface unit is connected to the semiconductor manufacturing apparatus via a network, and said production management system interface unit is connected to the production management system via the network, and said production management system substitution unit is on-line connected to the semiconductor manufacturing apparatus via said apparatus interface unit and the network, and said production management system substitution unit is connected to the semiconductor manufacturing apparatus using identical communication protocols.

6. A semiconductor manufacturing system comprising:

a production management system which outputs an instruction about manufacture of a semiconductor device and a request for process data, the production management system including a production management unit;

a semiconductor manufacturing apparatus which manufactures the semiconductor device upon reception of the instruction and outputs process data in accordance with the request; and a semiconductor manufacturing apparatus data acquisition apparatus which communicates with said semiconductor manufacturing apparatus or with said production management system and said semiconductor manufacturing apparatus, said semiconductor manufacturing apparatus data acquisition apparatus including a production management system interface unit which communicates with the production management system when said production management system interface unit is electrically connected to the production management system, an apparatus interface unit which communicates with the semiconductor manufacturing apparatus, and a production management system substitution unit having a data communication unit which communicates with the semiconductor manufacturing apparatus via said apparatus interface unit when the production management system can not communicate with said production management system interface unit, and an initial setting information transmission unit which transmits initial setting information required for pre-registration upon acquiring process data from the semiconductor manufacturing apparatus, the production management system substitution unit not having a production management unit, when the production management system can communicate with said production management system interface unit, the production management system and the semiconductor manufacturing apparatus communicating with each other via said production management system interface unit and said apparatus interface unit to receive process data output from the semiconductor manufacturing apparatus, and when the production management system cannot communicate with said production management system interface unit, said production management system substitution unit and the semiconductor manufacturing apparatus communicating with each other via said apparatus interface unit to receive the process data output from the semiconductor manufacturing apparatus.

7. The manufacturing system according to claim 6, wherein said semiconductor manufacturing apparatus data acquisition apparatus further comprises:

a storage unit which stores the process data upon receiving the process data; and a data monitor unit which monitors validity of the process data transferred from said semiconductor manufacturing apparatus to said apparatus interface unit and transfers the process data to said storage unit when the process data is determined to be valid.

8. The manufacturing system according to claim 7, wherein said production management system comprises a production management unit which performs production management when said semiconductor manufacturing apparatus manufactures the semiconductor device, a first communication unit which communicates data with said semiconductor manufacturing apparatus via said production management system interface unit and said apparatus interface unit, and a first initial setting information transmission unit which transmits initial setting information necessary for requesting said semiconductor manufacturing apparatus data acquisition apparatus to send process data; and said production management system substitution unit comprises a second data communication unit which communicates data with said semiconductor manufacturing apparatus via said apparatus interface unit, and a second initial setting information transmission unit which transmits initial setting information necessary for requesting said storage unit to send process data.

9. The manufacturing system according to claim 6, wherein said apparatus interface unit is connected to said semiconductor manufacturing apparatus via a network, and said production management system interface unit is connected to said production management system via the network, and said production management system substitution unit is on-line connected to said semiconductor manufacturing apparatus via said apparatus interface unit and the network, and said production management system substitution unit is connected to said semiconductor manufacturing apparatus using identical communication protocols.

10. The manufacturing system according to claim 7, wherein said apparatus interface unit is connected to said semiconductor manufacturing apparatus via a network, and said production management system interface unit is connected to said production management system via the network, and said production management system substitution unit is on-line connected to said semiconductor manufacturing apparatus via said apparatus interface unit and the network, and said production management system substitution unit is connected to said semiconductor manufacturing apparatus using identical communication protocols.

11. The manufacturing system according to claim 6, wherein said manufacturing system further comprises a storage unit which is connected to said semiconductor manufacturing apparatus data acquisition apparatus and stores the process data upon reception thereof from said semiconductor manufacturing apparatus data acquisition apparatus, and said semiconductor manufacturing apparatus data acquisition apparatus further comprises a data monitor unit which monitors validity of the process data transferred from said semiconductor manufacturing apparatus to said apparatus interface unit and transfers the process data to said storage unit when the process data is determined to be valid.

12. A semiconductor manufacturing apparatus data acquisition apparatus which communicates with a semiconductor manufacturing apparatus and configured to of communicate with both the semiconductor manufacturing apparatus and a production management system, the production management system including a production management unit, the semiconductor manufacturing apparatus data acquisition apparatus comprising:

an interface unit which communicates with the production management system and the semiconductor manufacturing apparatus when said production management system interface unit is electrically connected to the production management system; and a production management system substitution unit having a data communication unit which communicates with the semiconductor manufacturing apparatus via said interface unit when the production management system cannot communicate with said interface unit, and an initial setting information transmission unit which transmits initial setting information required for pre-registration upon acquiring process data from the semiconductor manufacturing apparatus, the production management system substitution unit not having a production management unit, wherein when the production management system can communicate with said interface unit, the production management system and the semiconductor manufacturing apparatus communicate with each other via said interface unit to receive process data output from the semiconductor manufacturing apparatus, and when the production management system cannot communicate with said interface unit, said production management system substitution unit and the semiconductor manufacturing apparatus communicate with each other via said interface unit to receive the process data output from the semiconductor manufacturing apparatus.

13. The acquisition apparatus according to claim 12, further comprising:

a storage unit which stores the process data upon receiving the process data; and a data monitor unit which monitors validity of the process data transferred from the semiconductor manufacturing apparatus to said interface unit and transfers the process data to said storage unit when the process data is determined to be valid.

14. The acquisition apparatus according to claim 13, wherein said production management system substitution unit comprises:

a data communication unit which performs data communication with the semiconductor manufacturing apparatus via said interface unit; and an initial setting information transmission unit which transmits initial setting information necessary for requesting said storage unit to send process data.

15. The acquisition apparatus according to claim 1, wherein said interface unit is connected to the semiconductor manufacturing apparatus via a network, and said interface unit is connected to the production management system via the network, and said production management system substitution unit is on-line connected to the semiconductor manufacturing apparatus via said interface unit and the network, and said production management system substitution unit is connected to the semiconductor manufacturing apparatus using identical communication protocols.

* * * * *